(12) United States Patent
D'hondt

(10) Patent No.: US 10,316,992 B2
(45) Date of Patent: Jun. 11, 2019

(54) TUBING FOR FLUID COOLING SYSTEMS

(71) Applicant: GM GLOBAL TECHNOLOGY OPERATIONS LLC, Detroit, MI (US)

(72) Inventor: Dennis M D'hondt, Ray, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 15/618,490

(22) Filed: Jun. 9, 2017

(65) Prior Publication Data

US 2018/0356011 A1 Dec. 13, 2018

(51) Int. Cl.

| F16L 11/00 | (2006.01) |
|---|---|
| F16L 11/04 | (2006.01) |
| F16L 11/12 | (2006.01) |
| B32B 7/12 | (2006.01) |
| B60R 16/08 | (2006.01) |
| F01P 11/04 | (2006.01) |
| F02B 29/04 | (2006.01) |
| F16L 37/00 | (2006.01) |

(52) U.S. Cl.
CPC .............. *F16L 11/045* (2013.01); *B32B 7/12* (2013.01); *F16L 11/125* (2013.01); *B60R 16/08* (2013.01); *C09J 2427/006* (2013.01); *C09J 2477/006* (2013.01); *F01P 11/04* (2013.01); *F02B 29/045* (2013.01); *F16L 37/00* (2013.01)

(58) Field of Classification Search
CPC ....... F16L 11/04; F16L 11/045; Y10S 138/03; Y10S 138/07

USPC .................... 138/137, 125, 141, DIG. 3, 124
See application file for complete search history.

(56) References Cited

U.S. PATENT DOCUMENTS

| 4,156,127 A * | 5/1979 | Sako | H05B 3/06 |
| | | | 137/141 |
| 5,170,011 A * | 12/1992 | Martucci | B32B 1/08 |
| | | | 174/47 |
| 5,483,412 A * | 1/1996 | Albino | H05F 3/00 |
| | | | 138/125 |
| 5,507,320 A * | 4/1996 | Plumley | F16L 11/085 |
| | | | 138/123 |
| 5,653,266 A * | 8/1997 | Reynolds | B29C 47/0023 |
| | | | 138/137 |
| 5,884,672 A * | 3/1999 | Noone | B32B 1/08 |
| | | | 138/137 |
| 5,937,911 A * | 8/1999 | Kodama | B32B 1/08 |
| | | | 138/137 |
| 5,964,251 A * | 10/1999 | Reynolds | B29C 47/0023 |
| | | | 138/137 |
| 6,089,278 A * | 7/2000 | Nishino | B32B 1/08 |
| | | | 138/137 |
| 6,293,312 B1 * | 9/2001 | Stripe | F16L 11/04 |
| | | | 138/137 |

(Continued)

*Primary Examiner* — Patrick F Brinson

(57) ABSTRACT

A plastic tubing having at least two layers for a fluid cooling system includes a first layer being formed from an ethylene tetrafluoroethylene or a fluorinated ethylene propylene based plastic material and configured as an internal lining formed of a fluorocarbon plastic material. Further, a second layer is configured as a sheathing to the first layer and formed from polyamide material. An adhesive layer may be disposed between the first and second layer and at least one other layer may be configured as an external sheathing of the plastic tubing formed from an elastomer based material.

12 Claims, 2 Drawing Sheets

(56) References Cited

U.S. PATENT DOCUMENTS

| | | | | |
|---|---|---|---|---|
| 6,641,884 | B1* | 11/2003 | Martucci | B32B 1/08 |
| | | | | 428/36.1 |
| 6,655,414 | B2* | 12/2003 | Nishi | B32B 1/08 |
| | | | | 138/137 |
| 6,948,528 | B2* | 9/2005 | Martucci | B32B 1/08 |
| | | | | 138/121 |
| 8,936,047 | B2* | 1/2015 | Hahn | B29C 53/58 |
| | | | | 138/121 |
| 2002/0144742 | A1* | 10/2002 | Martucci | F16L 11/085 |
| | | | | 138/125 |
| 2007/0277896 | A1* | 12/2007 | Takagi | F16L 11/04 |
| | | | | 138/137 |
| 2008/0029178 | A1* | 2/2008 | Bentley | F16L 11/088 |
| | | | | 138/127 |
| 2012/0216903 | A1* | 8/2012 | Osborne | B65H 69/08 |
| | | | | 138/137 |
| 2014/0053939 | A1* | 2/2014 | Kaye | A61M 39/12 |
| | | | | 138/109 |

\* cited by examiner

TUBING FOR FLUID COOLING SYSTEMS

INTRODUCTION

The disclosure generally relates to a hose assembly. More particularly, the disclosure relates to a plastic tubing for fluid cooling system applications.

BACKGROUND

Hose and tubing assemblies, particularly flexible hose and tubing assemblies used in vehicles and other mechanisms, may be subject to extreme conditions. The hose assemblies may be used for conveying fluids, such as power steering fluid, brake fluid, liquid fuels, diesel emission fluid, engine oil, transmission fluid, AC refrigerant, etc. The hose and tubing assemblies often should be capable of withstanding high internal fluid pressures, should resist wear and/or abrasion so as to maintain operability, and should prevent leaks, as well as, in some applications should be capable of resisting moderate to high temperatures.

SUMMARY

A tubing assembly is provided. A plastic tubing having at least two layers for a fluid cooling system in accordance with the exemplary embodiment includes a first layer configured as an internal lining formed of a fluorocarbon plastic material, and a second layer configured as a sheathing to the first layer and formed of a polyamide based material.

Another aspect of the exemplary embodiment includes the first layer being formed from an ethylene tetrafluoroethylene or a fluorinated ethylene propylene based plastic material. And another aspect includes the first layer being formed from a polytetrafluoroethylene or a perfluoroalkoxy based plastic material. Still another aspect wherein the polyamide based material is polyamide 6.10. And still another aspect includes an adhesive layer disposed between the first and second layer.

Yet another aspect in accordance with the exemplary embodiment includes at least one other layer configured as an external sheathing of the plastic tubing formed from an elastomer based material. And yet another aspect includes at least one other layer configured as an external sheathing of the plastic tubing formed from a thermoplastic elastomer based material. Still another aspect includes high temperature plastic quick connectors disposed on connecting ends of the plastic tubing. And still another aspect includes the plastic tubing being a spin weldable composite layer plastic tubing.

And another aspect of the exemplary embodiment wherein the fluid cooling system is a transmission oil cooling system. And still another aspect wherein the fluid cooling system is an engine oil cooling system. And yet another aspect wherein the fluid cooling system is a charge air cooler system.

The above features and advantages and other features and advantages of the present teachings are readily apparent from the following detailed description of the best modes for carrying out the teachings when taken in connection with the accompanying drawings.

DETAILED DESCRIPTION

Figure 1:
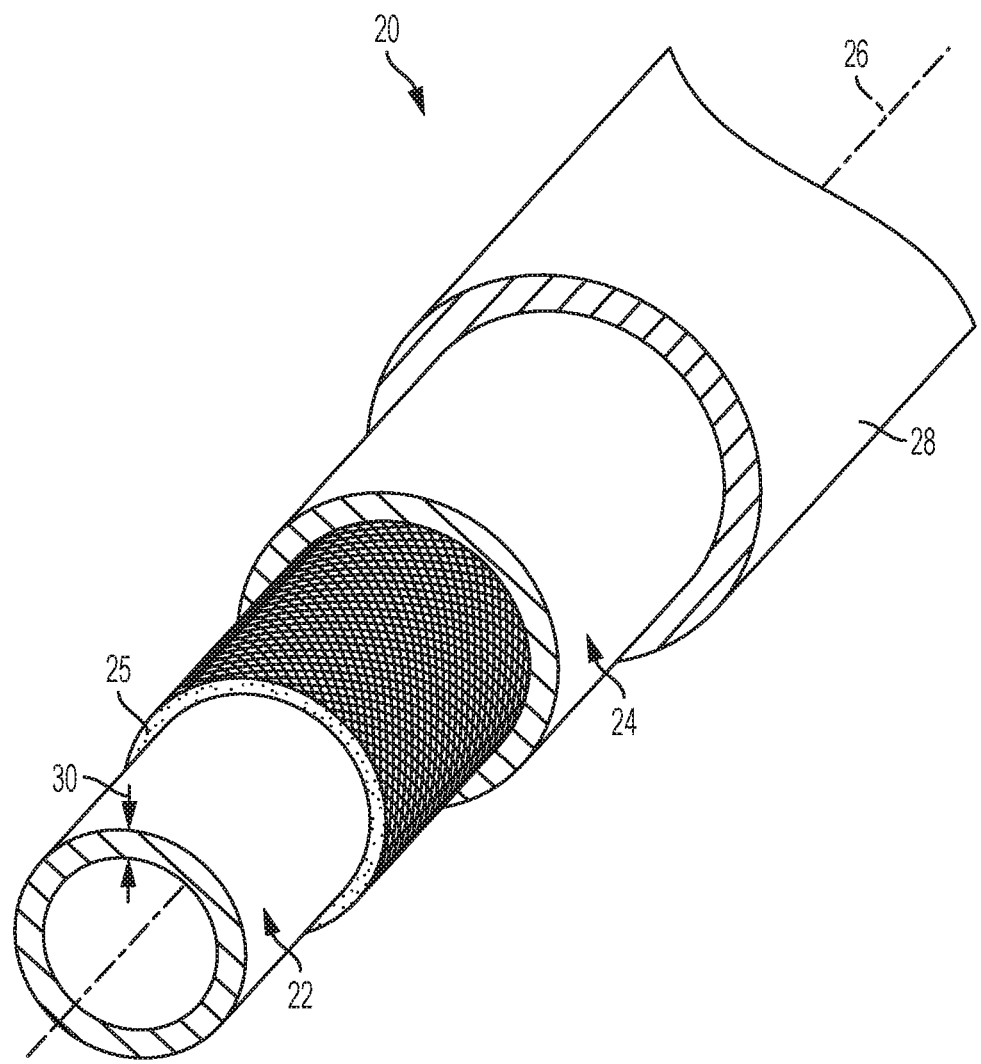
FIG. 1 is a schematic perspective view of a plastic tubing having at least two layers in accordance with an exemplary embodiment.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a plastic tubing having at least two layers in accordance with aspects of an exemplary embodiment is generally shown at 20. The plastic tubing 20 includes a first layer 22 configured as an internal lining formed of a fluorocarbon plastic material and is covered by a second layer 24 configured as a sheathing to the first layer (excluding the intermediate layers) and formed of a polyamide based material. In a preferred exemplary embodiment, the second layer 24 is formed polyamide 6.10 (PA 6.10) which has a high heat resistance and high mechanical strength at both room temperature and high temperature, which is critical to maintaining adequate burst pressure at high temperature. PA6.10 also has a high flex modulus.

The plastic tubing 20 is concentric with and extends along a centerline 26. The first layer 22 is the internal lining of the plastic tubing 20 and formed of fluorocarbon plastic material which will depend on the maximum operational temperatures expected for the type of cooling fluid, e.g., automatic transmission fluid, engine oil, or charge air of an air charger system. Accordingly, the first layer 22 may be formed from an ethylene tetrafluoroethylene or a fluorinated ethylene propylene based plastic material for moderate temperature applications, e.g., up to 150° C., or may be formed from a polytetrafluoroethylene or a perfluoroalkoxy based plastic material for high temperature applications, e.g., up to 200° C.

It should be appreciated that the plastic tubing 20 may be used in any mechanism. As such, the fluids that the plastic tubing 20 may be used to convey should not be limited to the exemplary fluids noted herein. Therefore, the first layer 22 may be chemically resistant to some other fluids not described herein up to the maximum temperature capability of the plastic tubing 20.

Additionally, the plastic tubing 20 may include an adhesive layer 25 disposed between the first and second layer to allow for maximum flexibility in material grade and manufacturing choice. Further, the plastic tubing 20 may include at least one other layer 28 configured as an external sheathing of the plastic tubing 20 formed from an elastomer or thermal elastomer based material which would be sufficient to shield the second layer 24 from environmental exposure to corrosive substances, e.g., metallic chloride. Still further, the plastic tubing 20 may include spin weldable high temperature plastic quick connectors (not shown) disposed on connecting ends for ease of installation and a more secure connection than crimped metal connections. It is appreciated that the plastic tubing 20 may also use other connectors, including metal connectors, suitable for the intended purpose without exceeding the scope of the exemplary embodiment.

The plastic tubing 20 in accordance with the exemplary embodiment uses different polymers than current plastic tubing use for such purpose, and the composite assembly results in a lighter weight tube. The plastic tubing can be formed to tighter bend radii than most hoses to facilitate easier packaging. The plastic tubing 20 in accordance with the exemplary embodiment can also be made spin weldable. The plastic tubing 20 can be configured for utility in, but not limited to, transmission oil cooling systems, engine oil cooling systems, and charge air cooler systems.

The first layer 22 may include a radial thickness 30 measured relative to the centerline 26 that is between 0.5 mm and 5.0 mm. It should be appreciated that the radial thickness 30 of the first layer 22 may vary from the exemplary range noted above, and will depend upon the specific intended use of the plastic tubing 20.

Figure 2:
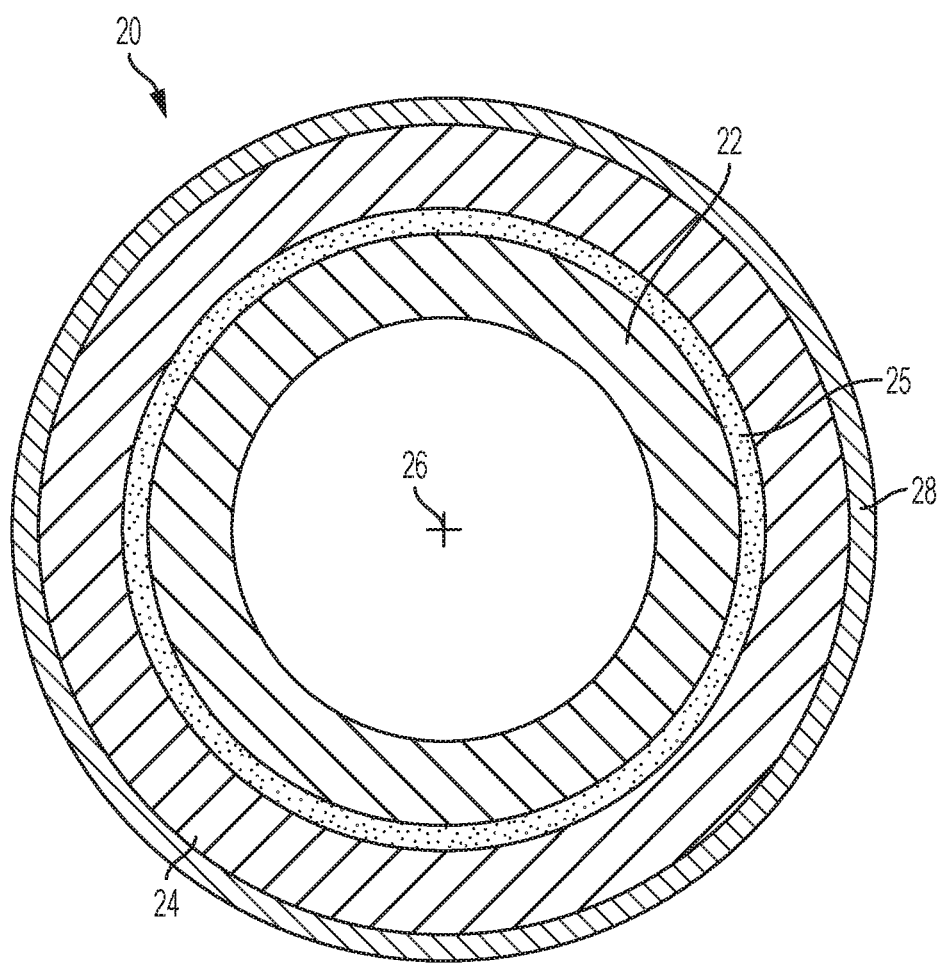
FIG. 2 is a schematic cross sectional view of a plastic tubing having at least two layers for a fluid cooling system in accordance with the exemplary embodiment.

Referring to FIG. 2, a schematic cross sectional view of a plastic tubing having at least two layers for a fluid cooling system in accordance with the exemplary embodiment is provided. As shown in the exemplary embodiment, the first layer 22 is disposed as the internal layer of the plastic tubing 20 and separated from the second fiber layer 24 by an intermediate adhesive layer 25. At least one other layer 28 is configured as a sheathing for the plastic tubing 20 to protect it from corrosive substances that it may be exposed to in its intended working environment or otherwise.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A plastic tubing having at least two layers for a fluid cooling system comprising:
    a first layer configured as an internal lining formed of a fluorocarbon plastic material; and
    a second layer configured as a sheathing to the first layer and formed of a polyamide based material, and wherein the first layer includes a radial thickness measured relative to a centerline that is equal to 5.0 mm.

2. The plastic tubing of claim 1 further comprising the first layer being formed from an ethylene tetrafluoroethylene or a fluorinated ethylene propylene based plastic material.

3. The plastic tubing of claim 1 further comprising the first layer being formed from a polytetrafluoroethylene or a perfluoroalkoxy based plastic material.

4. The plastic tubing of claim 1 wherein the polyamide based material is polyamide 6.10.

5. The plastic tubing of claim 1 further comprising an adhesive layer disposed between the first and second layer.

6. The plastic tubing of claim 1 further comprising at least one other layer configured as an external sheathing of the plastic tubing formed from an elastomer based material.

7. The plastic tubing of claim 1 further comprising at least one other layer configured as an external sheathing of the plastic tubing formed from a thermoplastic elastomer based material.

8. The plastic tubing of claim 1 further comprising spin weldable high temperature plastic quick connectors disposed on connecting ends.

9. The plastic tubing of claim 1 further comprising being a spin weldable composite layer plastic tubing.

10. The plastic tubing of claim 1 wherein the fluid cooling system is a transmission oil cooling system.

11. The plastic tubing of claim 1 wherein the fluid cooling system is an engine oil cooling system.

12. The plastic tubing of claim 1 wherein the fluid cooling system is a charge air cooler system.

* * * * *